United States Patent [19]

Leason

[11] Patent Number: 4,749,003
[45] Date of Patent: Jun. 7, 1988

[54] CENTER FLOW CHECK VALVE

[75] Inventor: Hayden Leason, Humacao, P.R.

[73] Assignee: Filtertek, Inc., Hebron, Ill.

[21] Appl. No.: 6,021

[22] Filed: Jan. 22, 1987

[51] Int. Cl.$^4$ .............................................. F16K 15/14
[52] U.S. Cl. ................................................ 137/854
[58] Field of Search ......................................... 137/854

[56] References Cited

U.S. PATENT DOCUMENTS

| | | |
|---|---|---|
| 1,797,280 | 3/1931 | Zerk . |
| 2,223,944 | 12/1940 | Roy . |
| 3,228,418 | 1/1966 | Rosback et al. . |
| 3,626,978 | 12/1971 | Hoekstra .................. 137/854 |
| 3,633,613 | 1/1972 | Julow ..................... 137/854 X |
| 3,807,445 | 4/1974 | McPhee . |
| 3,889,710 | 6/1975 | Brost . |
| 3,954,121 | 5/1976 | Kardos . |
| 4,141,379 | 2/1979 | Manske . |
| 4,190,426 | 2/1980 | Ruschke . |
| 4,210,173 | 7/1980 | Choksi ..................... 137/854 X |
| 4,222,407 | 9/1980 | Ruschke et al. . |
| 4,238,207 | 12/1980 | Ruschke . |
| 4,246,932 | 1/1981 | Raines . |
| 4,286,628 | 9/1981 | Paradis et al. . |
| 4,298,358 | 11/1981 | Ruschke . |
| 4,310,017 | 1/1982 | Raines . |
| 4,369,812 | 1/1983 | Paradis et al . |
| 4,415,003 | 11/1983 | Paradis et al. . |
| 4,461,313 | 7/1984 | Beaumont . |
| 4,518,014 | 5/1985 | McAlpine . |
| 4,535,820 | 8/1985 | Raines . |
| 4,538,508 | 9/1985 | Ballard .................... 137/854 X |
| 4,550,749 | 11/1985 | Krikorian . |
| 4,610,275 | 9/1986 | Beecher .................... 137/854 |

FOREIGN PATENT DOCUMENTS 1600614 10/1981 United Kingdom ............... 137/854

Primary Examiner—Robert G. Nilson
Attorney, Agent, or Firm—Willian Brinks Olds Hofer Gilson & Lione Ltd.

[57] ABSTRACT

A check valve is disclosed made with a rotationally symetrical valve body with fluid inlet and outlet holes centered on the axis of symetry. A circular, flexible diaphragm is held in place inside the valve body by a mounting pin which extends through a hole in the diaphragm. The mounting pin and an opposing mounting pin receptical are supported by legs protruding inwardly from the inlet and outlet walls of the valve body and bridging over the inlet and outlet holes. The length of the legs determine the position of the diaphragm with respect to the inlet wall against which the diaphragm seals. Thus the opening pressure of the valve is dependant on the length of the legs.

11 Claims, 2 Drawing Sheets

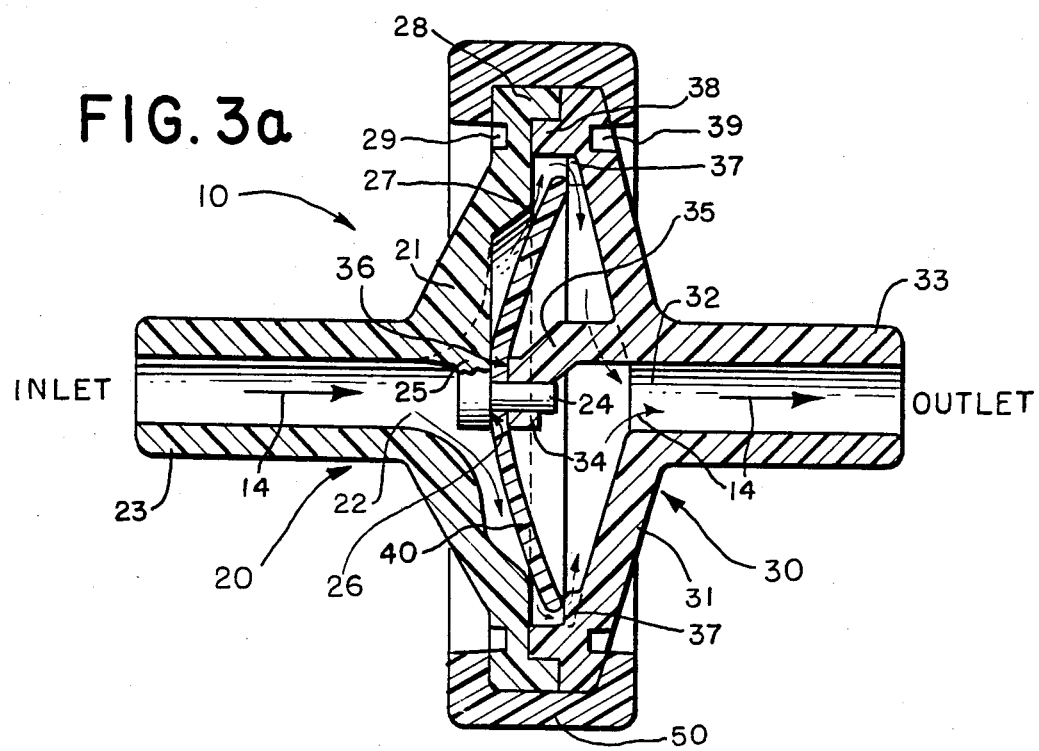
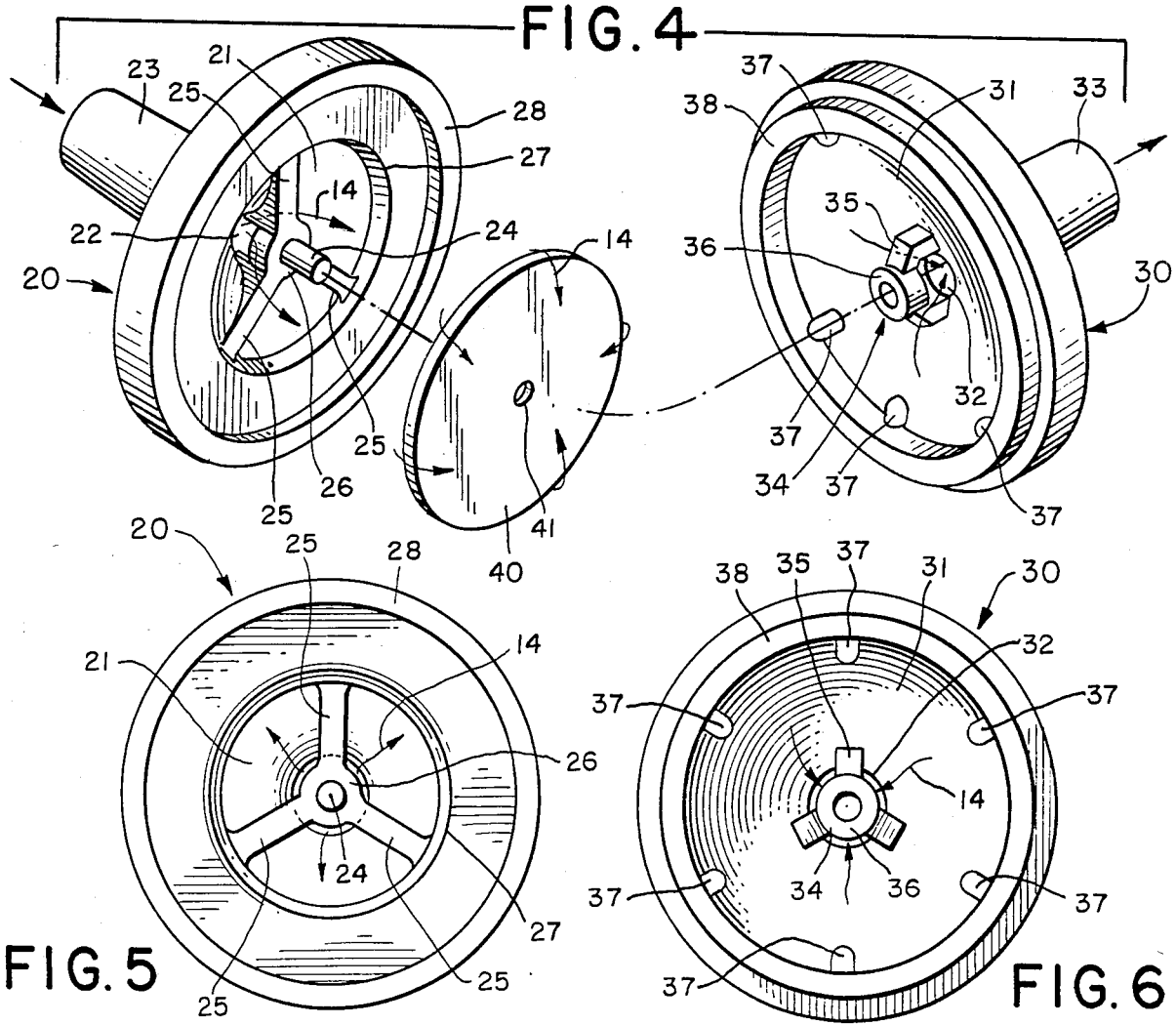

1

CENTER FLOW CHECK VALVE

BACKGROUND OF THE INVENTION

This invention relates to check valves, and more particularly to a center flow check valve for use in an I.V. administration set.

Check valves for a variety of different applications are well known. The purpose of a check valve is to allow fluid to flow in only one direction. In the medical field, it is advantageous to include one or more check valves in the tubing set used during interveinous infusion of fluids to a patient. Such fluids often include drugs. It is therefore desirable to limit the size of the check valve in order to minimize the volume of fluid containing the drugs which fills the valve and is generally thrown away with the valve.

Samples of various check valve designs are depicted in U.S. Pat. Nos. 4,415,003, 4,369,812 and 4,286,628 to Paradis et al., U.S. Pat. Nos. 4,535,820, 4,310,017 and 4,246,932 to Raines, U.S. Pat. No. 4,222,407 to Ruschke et al., and U.S. Pat. No. 3,889,710 to Brost. As disclosed in many of these patents, it is very common in check valves to use a flexible diaphragm (often called a disk) to seal off a flow path through the valve body to prevent back flow. One problem often encountered in using a disk in a check valve is a difficulty in keeping the disk properly positioned in relation to the flow path and the sealing surface against which it is to act. One solution to this problem has been to provide a hole in the disk through which a mounting pin extends, holding the disk against transverse movement. In a known design of this type, however, the flow pattern through the valve cannot be centered around the disk since the mounting pin extends from the central portion of a valve body.

Other problems often encountered in check valves using flexible disks is that the disk is held in a position which overly stresses the disk member, causing valve sticking and leading to early failure of the disk member.

When used in disposable I.V. administration sets, the cost of the valve is very important, since it is generally disposed of after a single use.

SUMMARY OF THE INVENTION

The present invention is directed to a centerflow check valve having a valve body which is symmetrical about on axis of rotation. The inlet and outlet to the valve body are both centered about this axis of symmetry. The valve includes a diaphragm held in place by a center mounting pin. The mounting pin and an opposing mounting pin receptacle are supported on legs which protrude inwardly from inlet and outlet walls of the valve body, bridging the inlet and outlet holes. The disk, mounting pin and mounting pin receptacle are all centered about the valve body's axis of symmetry.

The check valve of the present invention is of simple and economical design, but has good flow characteristics, minimal opening pressure requirements, and the diaphragm is not significantly stressed, though it is fixed in its proper position.

Other aspects of the invention include forming the valve body from two conically shaped members (an inlet member and an outlet member), hermetically sealed together by an overmold. The conical shape has been found to help prevent air from being entrapped in the valve. In the preferred embodiment, the mounting pin extends beyond the base of the conically shaped member to which it is attached. In this way, the valve body can be more easily assembled because the diaphragm can be held in place, though in an unstressed position, while the two valve body members are properly positioned relative to each other and snapped together.

It has been discovered that the present invention is highly advantageous in that the same general design can be used to make a series of check valves having differing flow characteristics (primarily opening pressures) by making a simple change to the shoulder position of the mounting pin and mounting pin receptacle. Where the valve is constructed from molded plastic parts, simple changes to the mold allow manufacture of these valves with different flow characteristics. This saves the cost of developing and designing a new valve to fit different application requirements.

These and other advantages, and the invention itself, will best be understood in reference to the attached drawings, a brief description of which follows:

BRIEF DESCRIPTION OF THE DRAWINGS

FIG. 3a is the same view as FIG. 3, except that the valve is shown in an open position.

FIG. 4 is an exploded view of the unassembled elements of the check valve of FIG. 1 excluding the overmold.

FIG. 5 is a view of the internal elements of the inlet housing of the check valve of FIG. 1.

FIG. 6 is a view of the internal element of the outlet housing of the check valve of FIG. 1.

DETAILED DESCRIPTION OF THE DRAWINGS AND OF THE PREFERRED EMBODIMENTS OF THE INVENTION

Figure 1:
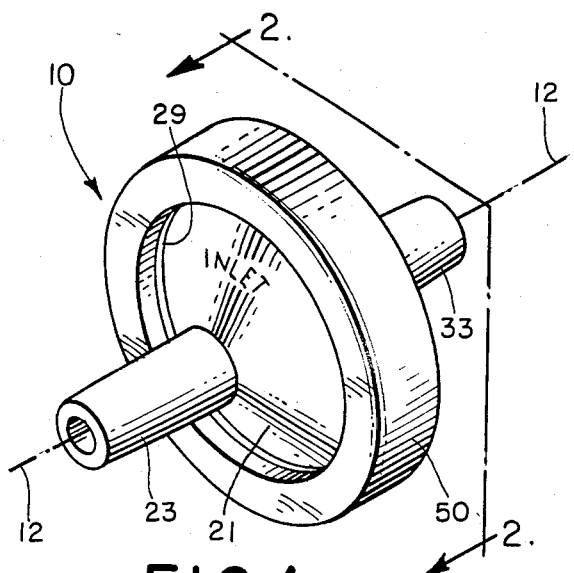
FIG. 1 is a perspective view of a check valve of the preferred embodiment of the present invention.

The preferred embodiment of the check valve 10 is shown in FIG. 1. Line 12 is an axis of rotation about which the body of the valve 10 is symetrical. As shown in FIGS. 2-6, the check valve 10 is constructed from an inlet member 20, an outlet member 30, a diaphragm 40 and an overmold 50 hermetically sealing the two members 20 and 30 together.

The inlet member 20 has an inlet wall 21 which is generally the shape of a right circular cone. At the apex of this cone is a inlet hole 22 through which fluids enter into the check valve body. A tubing connector 23 protrudes outwardly from the inlet wall 21 and has a fluid path therethrough in fluid communication with the inlet hole 22. A mounting pin 24 centered about the axis of the cone of the inlet wall 21 is supported by legs 25 protruding inwardly from the inlet wall 21. The legs 25 bridge over the inlet hole 22. At the base of the mounting pin 24 is a shoulder 26 formed by the top surface of the legs 25.

Figure 3:
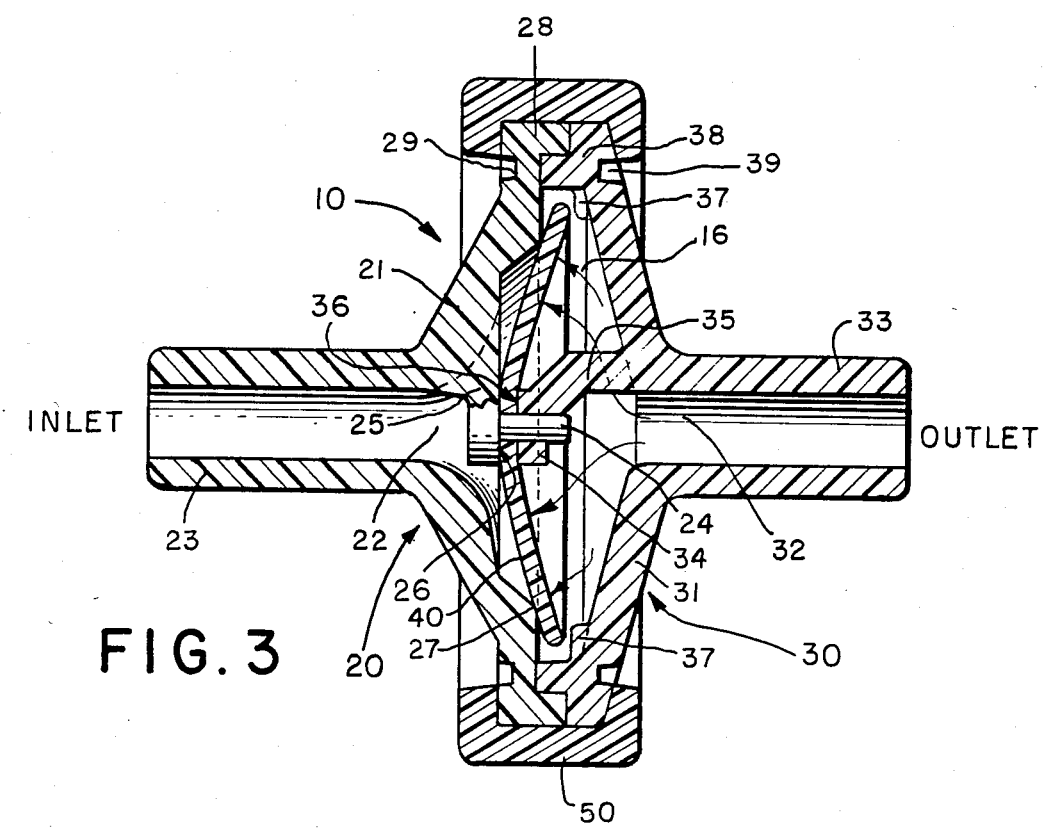
FIG. 3 is a cross-sectional view taken along line 3—3 of FIG. 2 and showing the diaphragm in its normally closed position.

The inlet wall 21 includes a ledge 27 at a diameter slightly less than the diameter of the diaphragm 40 against which the diaphragm is normally held in a sealing position as depicted in FIG. 3. The inlet member 20 also includes a connecting flange 28 at the periphery or base of the cone of the inlet wall 21. Also at the base of the cone on the outside of the inlet member 20 is a groove 29, used during the overmold process.

The outlet member 30 has an outlet wall 31 which is also generally the shape of a right circular cone, with an outlet hole 32 therethrough at the outlet wall cone apex. An outlet tubing connector 33 protrudes outwardly from the outlet wall 31 and has a flow path therethrough in fluid communication with outlet hole 32. The outlet wall 31 supports a mounting pin receptacle 34 which has a cylindrical hole through it, oriented along the axis of the outlet wall cone and sized to receive the mounting pin 24. The mounting pin receptacle 34 is supported by legs 35 protruding inwardly from the outlet wall 31. The legs 35 bridge over outlet hole 32, allowing fluid flow between the legs 35 and through the outlet hole 32. The top of the mounting pin receptacle 34 comprises a shoulder 36.

On the inside of outlet wall 31 are a plurality of projections 37 extending inwardly adjacent the circumference of the diaphragm 40. These projections 37 act as means for preventing the diaphragm 40 from sealingly engaging with the outlet wall 31 during fluid flow conditions. As with the inlet member 20, the outlet member 30 includes a connecting flange 38 and a groove 39.

The diaphragm 40 is flexible and circular in shape, having a hole 41 through its center, best seen in FIG. 4. The mounting pin 24 passes through the hole 41 to center the diaphragm 40 in the valve 10. When assembled, the shoulders 26 and 36 engage the diaphragm 40 and properly position it longitudinally within the valve body.

The valve 10 is constructed by first placing a diaphragm 40 in position on the mounting pin 24. As best seen in FIGS. 3 and 3a, the mounting pin 24 in the preferred embodiment extend beyond the base of the cone of the inlet wall 21 a distance greater than the thickness of the diaphragm 40. In this manner, the diaphragm 40 can lie flat but be properly centered while the valve is assembled. Next the outlet member 30 is positioned so that the mounting pin 24 will slide through the hole in the mounting pin receptacle 34. At the same time, the connecting flanges 28 and 38 mate to hold the valve body together as the inlet member 20 and outlet member 30 are pushed together.

As the two members are pushed together, the shoulder 36 on the face of the mounting pin receptacle 34 pushes on one face of the diaphragm 40, bringing the opposite face of diaphragm 40 up against shoulder 26 and forcing the diaphragm 40 into a somewhat parabolic shape as the ledge 27 bears against the diaphragm 40 adjacent its circumference.

After the inlet and outlet members are connected, the assembled valve body is placed in an overmold tool. Rings within the overmold tool fit within grooves 29 and 39 to support the valve body against the pressure exerted during the overmolding procedure. During the overmolding procedure, overmold 50 hermetically seals the periphery of the check valve 10.

During use, the diaphragm 40 normally seals against ledge 27. When the fluid pressure at the inlet hole 22 exceeds the fluid pressure at the outlet hole 32 by a specified value, the diaphragm 40 deforms and the fluid is allowed to flow into the valve body through the inlet hole 22, through paths between the legs 25, around the periphery of the diaphragm 40, back between the legs 35 and through the outlet hole 32. This flow is depicted by arrows 14 in FIG. 3a. As shown in FIG. 3, any fluid trying to flow backwards through the valve body is prevented by the normal sealing arrangement of the diaphragm 40 against the ledge 27. Arrows 16 demonstrate the force applied by fluids exerting a back pressure against the diaphragm 40.

As was previously mentioned, the specified value at which the check valve will open is dependent upon the placement of the shoulders 26 and 36 with respect to the sealing ledge 27. In other words, the further that the shoulder 36 forces the diaphragm 40 into a parabolic shape, the greater the pressure required between the inlet hole 22 and outlet hole 32 to allow fluid to unseal the diaphragm 40 and pass by. Thus by changing the shape or the length of the legs 25 and 35, the flow characteristics (primarily the opening pressure of the valve) may be modified. As will be understood by those skilled in the art, the modification of a tool to produce molded pieces having different leg lengths is a simple modification as compared to redesigning a valve and producing additional tooling.

In the preferred embodiment, the outlet wall 31 is conically shaped so that the cone forms an angle of approximately 15 degrees at its base. This design has been found to provide a mechanism whereby air or fluids trapped within the valve are forced through the outlet. Thus trapped air does not interfere with the flow characteristics of the valve, and if the fluid flowing through the valve is changed, all of the prior fluid is flushed through the valve. In the preferred embodiment, the cone of the inlet wall 21 has an angle of about 30 degrees at its base.

The design of the preferred embodiment is very beneficial when making valves of a very small volume. In the preferred embodiment, the valves only enclose a volume of about 0.3 milliliters. In this manner, the valves are suitable for use in I.V. administration sets where drug loss in voids within the set must be minimized. It is generally desirable to have valves in such applications with a total enclosed volume of less than 0.5 milliliters. In applications requiring such small sizes, the design of the present invention provides a simple but reliable check valve.

In prior art devices where the diaphragm is kept in place by interference with the wall of the valve body, the area between the diaphragm circumference and the valve body inside periphery must be kept small, thus limiting flow around the outside of the diaphragm. One advantage of having the diaphragm 40 centered by use of the mounting pin 24 is that the diameter of the diaphragm need not be close to the internal size of the valve body. Thus the space for fluid flow can be made greater, providing a valve with less resistance to flow.

The valve of the present invention has good flow capabilities with minimal opening pressures. In the preferred embodiment, with a diaphragm 40 of about 0.43 inches in diameter and about 0.015 inches thick, where the diaphragm is made of a material with a Shore A durometer of approximately 30, the opening pressure of the valve is only about 2 inches of water. Check valves in these types of applications are preferably formed with opening pressures of between zero and four inches of water. Twenty-seven inches of water corresponds to a pressure of 1 p.s.i.

In the preferred embodiment, each set of legs 25 and 35 comprise a tripod arrangement. The tripod arrangement allows for adequate flow between the legs yet provides good strength for supporting the mounting pin 24 and mounting pin receptacle 34. Of course numbers of legs other than three may also be suitable with appropriate modification. In the preferred embodiment, the diameter of hole 41 of the diaphragm is slightly less than the diameter of the mounting pin 25. This provides an interference fit giving a good seal at the diaphragm hole 41. A range of 0.01 to 0.06 inches, preferably 0.02 inches, of interference is applicable to the small diameter valves of the preferred embodiment.

In the preferred embodiment, the inlet member 20, outlet member 30 and overmold 50 are formed of a rigid plastic material such as plexiglass DR-100, a product of the Rohm & Haus. The preferred diaphragm material is a methyl vinly silicon such as HT-610 silicon from Biscote, 1420 Renaissance Drive, Park Ridge, Ill. 60068. This particular material has a durometer of 30 plus or minus 5 (Shore A), a tensile strength of about 720 p.s.i., a density of about 75.5 pounds per cubic foot and a tear strength of about 80 PPI (Die B).

Figure 2:
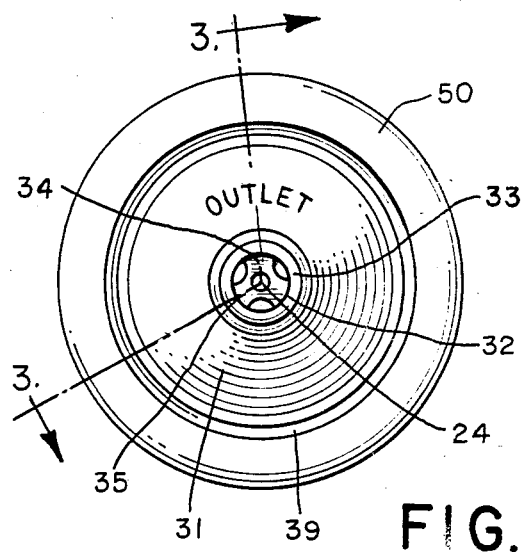
FIG. 2 is an endview of the check valve of FIG. 1 taken along line 2—2 of FIG. 1.

In the preferred embodiment, the inlet wall may be textured such as is known in the art to prevent sticking of the diaphragm to the ledge 27. To aid in assembly, the two body members 20 and 30 may be labeled "inlet" and "outlet" as shown in FIGS. 1 and 2, or one part can be made of pigmented material to aid in distinguishing between parts. Of course, modifications may be made to the preferred embodiment disclosed herein without departing from the scope and spirit of the invention. In addition to other modifications discussed above, the mounting pin 24 and receptacle 34 may be reversed in being supported from the outlet wall 30 and the inlet wall 20 respectively. It is therefore intended that the foregoing detailed description be regarded as illustrative rather than limiting, and that the following claims, including all equivalents, define the scope of the invention.

I claim:

1. A check valve comprising
   (a) a valve body symmetrical about an axis of rotation comprising an inlet wall and an outlet wall, with inlet and outlet holes respectively therethrough and centered on the axis of symmetry;
   (b) an inlet tubing connector and an outlet tubing connector protruding outwardly respectively from said inlet wall and said outlet wall;
   (c) flow channels extending through said tubing connectors in fluid communication resepectively with said inlet and outlet holes;
   (d) a diaphragm mounting pin and a mounting pin receptacle, each centered about said axis of symmetry and each supported in opposing relation by legs protruding inwardly from one or the other of said walls, said legs bridging over and allowing fluid flow through said inlet and outlet holes;
   (e) a flexible diaphragm with a hole through its center, said diaphragm hole being centered on said mounting pin;
   (f) said diaphragm hole, mounting pin and mounting pin receptacle cooperating so as to hold said diaphragm in sealing position against said inlet wall when the fluid pressure at the inlet hole does not exceed the fluid pressure at the outlet hole by a specified value; and
   (g) means for preventing said diaphragm from sealing against said outlet wall during fluid flow through the valve body from the inlet hole and out the outlet hole.

2. The check valve of claim 1 wherein both sets of legs protruding inwardly from said walls comprise a tripod.

3. The check valve of claim 1 wherein the inlet wall further comprises a ledge at a diameter less than the diameter of the diaphragm against which said diaphragm is normally held in sealing position.

4. The check valve of claim 1 wherein the valve body is constructed of two members hermetically sealed by an overmold.

5. The check valve of claim 1 wherein the total enclosed volume of the valve body is less than about 0.5 ml.

6. The check valve of claim 1 wherein the diaphragm is circular in shape, and is about 0.43 inches in diameter and about, 0.015 inches thick, is of material with a Shore A durometer of approximately 30, and the specified pressure value is about 2 inches of water.

7. A check valve comprising:
   (a) an inlet member comprising
      (i) a conically shaped inlet wall having an inlet hole at the inlet cone apex,
      (ii) a tubing connector protruding outwardly from the inlet wall and having a fluid path therethrough in fluid communication with said inlet hole,
      (iii) a mounting pin oriented along the axis of the cone of the inlet wall and supported by legs protruding inwardly from the inlet wall and bridging the inlet hole and
      (iv) a connecting flange at the base of the inlet wall cone;
   (b) an outlet member comprising
      (i) a conically shaped outlet wall having an outlet hole at the outlet cone apex,
      (ii) a tubing connector protruding outwardly from the outlet wall and having a fluid path therethrough in fluid communication with said outlet hole,
      (iii) a mounting pin receptacle comprising a hole oriented along the axis of the outlet wall cone, said mounting pin hole being sized to receive said mounting pin, and said receptacle being supported by legs protruding inwardly from the outlet wall and bridging the outlet hole, and
      (iv) a connecting flange at the base of the outlet wall cone;
   (c) a flexible, circular diaphragm having a hole through its center, said diaphragm being mounted on said mounting pin with the mounting pin passing through said diaphragm hole, said diaphragm being mounted so as to be biased in sealing engagement with said inlet wall;
   (d) means for preventing said diaphragm from sealingly engaging said outlet wall; and
   (e) an overmold hermetically sealing the connecting flange of the inlet member with the connecting flange of the outlet member.

8. The check valve of claim 7 wherein the mounting pin extends past the base of the inlet wall cone further than the thickness of the diaphragm.

9. The check valve of claim 7 wherein the means for preventing sealing engagement between the diaphragm and the outlet wall comprises a plurality of projections extending inwardly from the outlet wall adjacent the circumference of the diaphragm.

10. The check valve of claim 7 wherein the wall of the inlet wall cone is generally a right circular cone having an angle of approximately 30° at its base and the outlet wall cone is generally a right circular cone having an angle of approximately 15° at its base.

11. The check valve of claim 7 wherein both the inlet and outlet members comprise an annular groove in their outside surfaces adjacent their connecting flanges, said groove sized to fit a support ring of an overmold tool.

* * * * *

UNITED STATES PATENT AND TRADEMARK OFFICE
CERTIFICATE OF CORRECTION

PATENT NO. : 4,749,003
DATED : June 7, 1988
INVENTOR(S) : Hayden Leason

It is certified that error appears in the above-identified patent and that said Letters Patent is hereby corrected as shown below:

ON THE TITLE PAGE,
IN THE ABSTRACT

On the cover sheet, line 2 of the Abstract, delete "symetrical" and substitute therefor --symmetrical--.

On the cover sheet, line 3 of the Abstract, delete "symetry" and substitute therefor --symmetry--.

IN THE BACKGROUND OF THE INVENTION

In col. 1, line 12, please delete "interveinous" and substitute therefor --intravenous--.

IN THE DETAILED DESCRIPTION OF
THE DRAWINGS AND OF THE PREFERRED
EMBODIMENTS OF THE INVENTION

In col. 2, line 46, please delete "symetrical" and substitute therefor --symmetrical--.

In col. 2, line 53, please delete "a" and substitute therefor --an--.

In col. 5, line 12, please delete "vinly" and substitute therefor --vinyl--.

UNITED STATES PATENT AND TRADEMARK OFFICE
CERTIFICATE OF CORRECTION

PATENT NO. : 4,749,003
DATED : June 7, 1988
INVENTOR(S) : Hayden Leason

It is certified that error appears in the above-identified patent and that said Letters Patent is hereby corrected as shown below:

IN THE CLAIMS

In col. 5, line 36, after "comprising" please insert --:--.

In col. 6, line 11, after "about" please delete --,--.

Signed and Sealed this

Seventh Day of August, 1990

Attest:

HARRY F. MANBECK, JR.

*Attesting Officer*   Commissioner of Patents and Trademarks